United States Patent
Charlas

(10) Patent No.: US 11,286,776 B2
(45) Date of Patent: Mar. 29, 2022

(54) METHOD FOR SEPARATION OF A METALLIC ELEMENT GLUED TO AN ELEMENT MADE OF A COMPOSITE MATERIAL

(71) Applicant: SAFRAN AIRCRAFT ENGINES, Paris (FR)

(72) Inventor: Mathieu Julien Charlas, Avon (FR)

(73) Assignee: SAFRAN AIRCRAFT ENGINES, Paris (FR)

(*) Notice: Subject to any disclaimer, the term of this patent is extended or adjusted under 35 U.S.C. 154(b) by 211 days.

(21) Appl. No.: 16/481,620

(22) PCT Filed: Jan. 26, 2018

(86) PCT No.: PCT/FR2018/050177
§ 371 (c)(1),
(2) Date: Jul. 29, 2019

(87) PCT Pub. No.: WO2018/138445
PCT Pub. Date: Aug. 2, 2018

(65) Prior Publication Data
US 2019/0383143 A1    Dec. 19, 2019

(30) Foreign Application Priority Data
Jan. 30, 2017   (FR) ..................... 17 50731

(51) Int. Cl.
*F01D 5/00* (2006.01)
*F01D 5/28* (2006.01)
(Continued)

(52) U.S. Cl.
CPC .............. *F01D 5/005* (2013.01); *F01D 5/282* (2013.01); *F01D 5/286* (2013.01); *F04D 29/023* (2013.01);
(Continued)

(58) Field of Classification Search
CPC .......... F01D 5/005; F01D 5/282; F01D 5/286; F01D 5/28; F04D 29/023; F04D 29/324;
(Continued)

(56) References Cited

U.S. PATENT DOCUMENTS 5,488,222 A * 1/1996 Gault ..................... H01T 19/04
                                                  250/324
5,705,233 A * 1/1998 Denes ..................... C04B 20/02
                                                  427/322
(Continued)

FOREIGN PATENT DOCUMENTS

DE   102013003612 A1 *  9/2014  ............... C09J 5/06
EP      0854208 A1      7/1998
(Continued)

OTHER PUBLICATIONS

Search Report issued in French Patent Application No. 17 50731 dated Oct. 11, 2017.
(Continued)

*Primary Examiner* — Juan G Flores
*Assistant Examiner* — Joshua R Beebe
(74) *Attorney, Agent, or Firm* — Pearne & Gordon LLP

(57) ABSTRACT

The invention relates to a method of separating at least one portion of a metallic part (3) glued to a composite material part (2) of the carbon-epoxy type, comprising a step to degrade the glued interface between the metallic part (3) and the composite material part (2). The metallic part (3) and the composite material part (2) are electrically connected to a dc electrical voltage generator so that an electrical potential difference can be applied to them to generate partial discharges in the glued interface to degrade the interface.

8 Claims, 1 Drawing Sheet

(51) Int. Cl.
*F04D 29/02* (2006.01)
*F04D 29/32* (2006.01)

(52) U.S. Cl.
CPC ...... *F04D 29/324* (2013.01); *F05D 2230/312* (2013.01); *F05D 2230/80* (2013.01); *F05D 2240/303* (2013.01); *F05D 2300/603* (2013.01)

(58) Field of Classification Search
CPC .... F04D 29/32; F04D 29/02; F05D 2230/312; F05D 2230/80; F05D 2230/70; F05D 2240/303; F05D 2300/603; C09J 2301/502; Y10T 156/11
See application file for complete search history.

(56) References Cited

U.S. PATENT DOCUMENTS

| | | | | |
|---|---|---|---|---|
| 5,785,498 | A * | 7/1998 | Quinn | F04D 29/324 416/224 |
| 5,863,667 | A * | 1/1999 | Poggi | H05F 3/00 428/608 |
| 6,620,308 | B2 * | 9/2003 | Gilbert | C09J 5/00 205/702 |
| 7,608,299 | B2 * | 10/2009 | Decams | C23C 16/18 427/248.1 |
| 7,780,419 | B1 * | 8/2010 | Matheny | F04D 29/324 416/221 |
| 7,841,834 | B1 * | 11/2010 | Ryznic | F04D 29/324 416/224 |
| 10,800,956 | B2 * | 10/2020 | Heucher | C09J 5/00 |
| 2001/0030094 | A1 * | 10/2001 | Pareti | F16D 69/026 188/250 R |
| 2013/0020670 | A1 * | 1/2013 | Hori | H01C 7/021 257/467 |
| 2016/0312793 | A1 * | 10/2016 | Robertson | F01D 5/288 |

FOREIGN PATENT DOCUMENTS

FR 2970197 A1 7/2012
FR 3025735 A1 3/2016

OTHER PUBLICATIONS

International Search Report issued in Application No. PCT/FR2018/050177 dated Apr. 30, 2018.
Written Opinion issued in Application No. PCT/FR2018/050177 dated Apr. 30, 2018.

* cited by examiner

METHOD FOR SEPARATION OF A METALLIC ELEMENT GLUED TO AN ELEMENT MADE OF A COMPOSITE MATERIAL

TECHNICAL FIELD

The invention relates to an fan blade of an aircraft engine such as a twin spool turbojet, comprising a blade body made of a composite material to which a metallic leading edge is glued.

STATE OF PRIOR ART

Due to its position at the inlet at the forward end of the engine, a fan is exposed to shocks related to the ingress of solid foreign bodies such as ice or birds, into the engine.

Since the resistance of a composite material such as epoxy carbon is not adapted to such shocks, a fan blade said to be made of a composite material typically comprises a blade body made of a composite material to which a leading edge is glued made of a metallic material such as a titanium based alloy.

The better resistance of titanium alloys to shocks thus makes such a blade better able to resist impacts of foreign bodies that take place largely on its leading edge, while remaining largely formed from a composite material to present an adapted global mechanical strength and mass.

In practice, the titanium leading edge is fixed by gluing to the leading edge of the blade body made of a composite material. In some cases, it is necessary to disassemble the leading edge and the blade body after gluing.

This situation can occur during fabrication when gluing did not take place correctly, and therefore has to be repeated. It can also occur during the life of the blade when the deteriorated metallic leading edge has to be replaced, since the blade body made of a composite material in in satisfactory condition.

In this domain, patent documents FR2992243B1 and FR3025735A1 provide information about a method of separation by laser shock and compression conducive to separation of this leading edge from the blade body that supports it.

It has also been envisaged to work cold, searching for a weak glued zone, by temperature difference to create a difference between the temperature of the body and the glued edge, by chemical dissolution of the leading edge or the composite forming the blade body, or by abrasion of the composite or the leading edge.

Considering that these solutions have not yet proven to be satisfactory since they cannot obtain first the leading edge and secondly the composite part intact, the purpose of the invention is to find an alternative solution for disassembly of a blade comprising a composite material body and a metallic leading edge glued to this body.

PRESENTATION OF THE INVENTION

To achieve this, the purpose of the invention is a method of separating at least one portion of a metallic part glued to a composite material part of the carbon-epoxy type, comprising a step to degrade the glued interface between the metallic part and the composite material part, in which the metallic part and the composite material part are electrically connected to a dc electrical voltage generator so that an electrical potential difference can be applied to them to generate partial discharges in the glued interface to degrade the interface.

With this solution, the metallic part can be separated from the composite part to which it is glued without the need to deform it or degrade it by mechanical or thermal forces or by chemical attack.

The invention also relates to a method thus defined in which the composite material part is a blade body and in which the metallic part is a leading edge glued to this blade body, and in which the blade body comprises a root through which this blade body is electrically connected to the electrical voltage generator.

The invention also relates to a method thus defined, comprising the assembly of a guard made of electrically insulating material surrounding the blade root to form an electrically insulating screen extending between the leading edge and the blade root to prevent the appearance of an electric arc between the blade root and the metallic leading edge.

The invention also relates to a method thus defined, wherein the guard is an electrically insulating elastomer part comprising a central opening arranged to hold the blade root by squeezing it.

The invention also relates to a method thus defined, wherein the guard comprises two complementary parts joined together to surround the blade root.

The invention also relates to a method thus defined, comprising a prior metallisation operation of a face of the blade root to apply voltage to most of the fibres of the composite material from which the blade body is made.

The invention also relates to a method thus defined, wherein metallisation is done by depositing a metallic layer of copper, aluminium, silver or gold by cold plasma.

The invention also relates to a method thus defined wherein metallisation is achieved by application of a copper or aluminium adhesive tape on the blade root to connect it to the voltage generator.

The invention also relates to a method thus defined, wherein the glued interface degradation step is implemented within an electrically insulating fluid such as pressurised nitrogen.

DETAILED PRESENTATION OF PARTICULAR EMBODIMENTS

Figure 1:
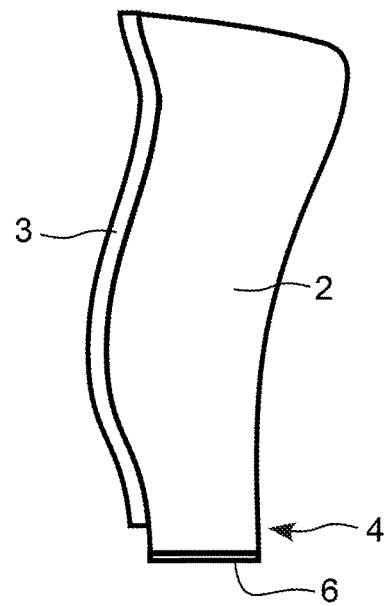
FIG. 1 is a lateral view of a blade comprising a body made of composite material onto which a metallic leading edge is glued.

On FIG. 1, a turbojet fan blade 1 made of a composite material, comprises a body 2 actually made of a composite material such as a carbon-epoxy type composite, to which a metallic leading edge 3 is fixed by gluing, this leading edge in this case being made of a titanium based alloy.

The body 2 comprises a root 4 or base through which it will be fixed to a rotor element of the motor, and at which composite material fibres of the blade body terminate with their ends flush with the surface.

The basic concept of the invention is to set up a dc electrical potential difference between the metallic leading edge and the blade body made of a composite material so as to cause partial discharges between these two elements, in other words at the glue forming their interface to deteriorate this glue.

To establish this potential difference, each of the metallic leading edge 2 and the blade root 4 are connected to a dc voltage generator not shown.

To achieve this, the root 4 of the blade 1 is metallised to deposit a metallic layer 6 on its face on which the carbon fibres terminate, to apply a voltage to the vast majority of carbon fibres forming the blade body.

This metallisation can be obtained by application of aluminium or copper adhesive tape available on the market, the necessary glue film only applying a negligible electrical resistance. This metallisation can also be obtained by the formation of a metallic deposit of copper, aluminium or gold added in the form of metallisation deposited by cold plasma.

Figure 2:
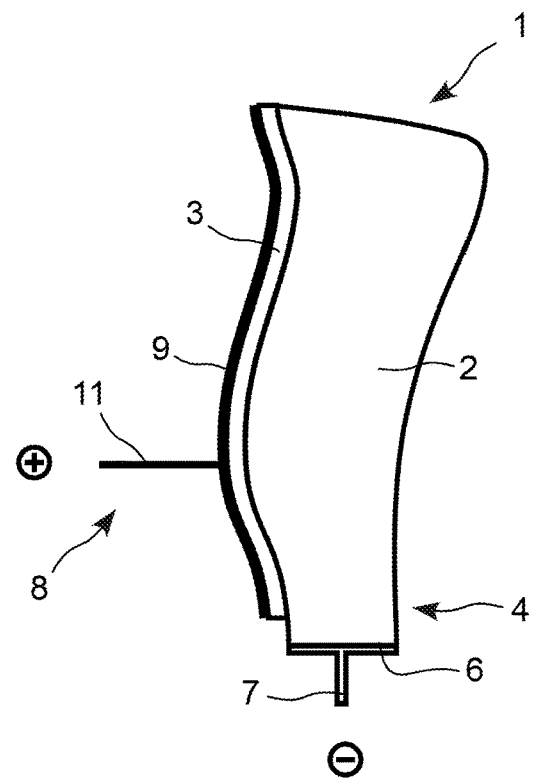
FIG. 2 is a lateral view of a blade comprising a body made of composite material to which a metallic leading edge is glued using electrical means of connecting the root and the leading edge.

As can be seen on FIG. 2, an electrode 7 is then added on the metallised face 6 and being electrically connected to this face. Connection of this electrode 7 to a terminal of the voltage generator can thus bring the vast majority of carbon fibres of the blade body 2 to the same potential, by connecting the dc voltage generator to the negative terminal.

Concerning the metallic leading edge 3, an electrode identified by the mark 8 on FIG. 2 is glued or brazed on this leading edge. This electrode can comprise a portion 9 that extends along the entire length of this leading edge and being glued or brazed to it, and that is prolonged by an end 11 oriented perpendicular to the leading edge, and that will be connected to the positive terminal of the voltage generator. Alternatively, a crocodile clip can be applied directly on the leading edge to squeeze it and be connected to the positive terminal of the dc voltage generator.

Figure 3:
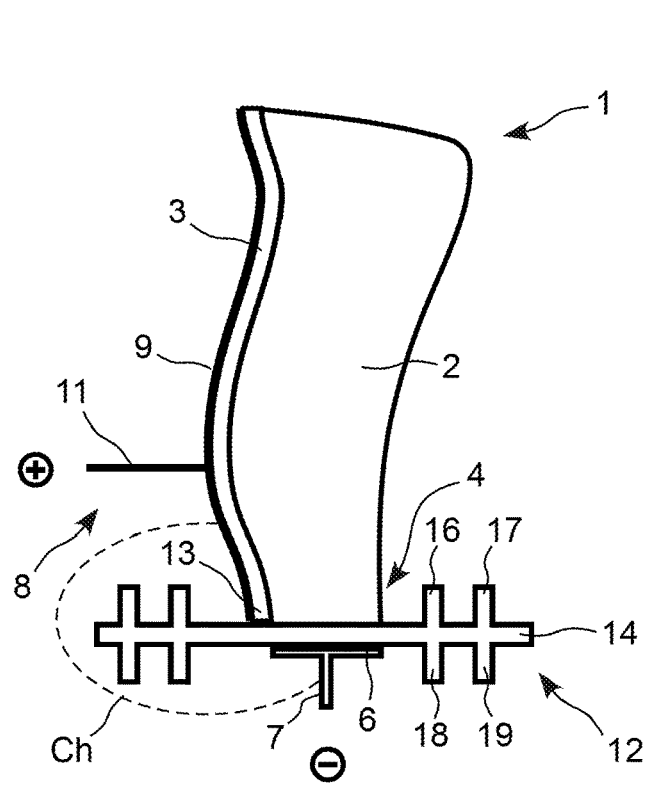
FIG. 3 is a lateral view of a blade comprising a body made of composite material to which a metallic leading edge is glued using electrical means of connecting the root and the leading edge and a guard surrounding the root.
Figure 4:
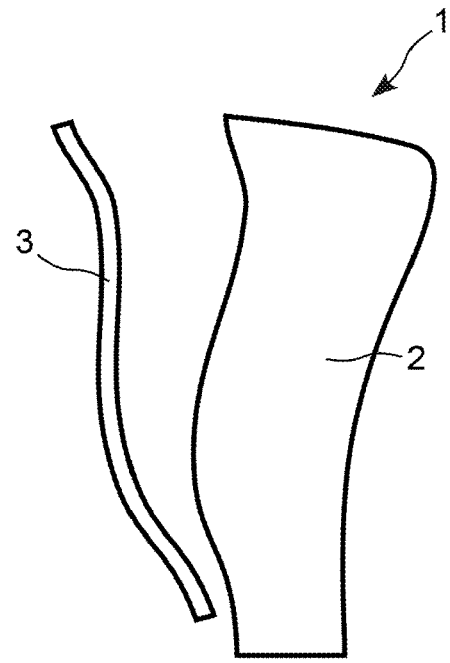
FIG. 4 is a side view showing separation of a metallic leading edge from a blade body made of a composite material.

Furthermore, a guard made of an electrically insulating material identified by the mark 12 on FIG. 3 is added onto the blade root so as to surround it. This guard 12 is arrange to form an insulating screen designed to prevent the formation of an electric arc between the metallised face 6 of the blade root 4, and the end 13 of the leading edge that is closest to this root.

This guard 12 that is advantageously fabricated from a flexible material such as a silicone elastomer or polyurethane forms a wall arranged to increase the distance to be travelled by an electric arc from the blade root 4 to an end 13 of the leading edge 3. This guard can also be fabricated from a cycloaliphatic epoxy, or mica/silicone or mica/epoxy material or any other appropriate material.

In the example in FIG. 3, this guard 12 comprises a bottom wall 14 with a generally oval contour comprising a central opening designed so that the blade root 4 can pass through it. When this guard is in place as in FIG. 3, it forms an electrically insulating partition interposed between the metallised face 6 and the end 13 of the metallic leading edge 3.

The choice of a flexible material for this guard makes it possible to apply pressure around the blade root so as to squeeze it and provide electrical insulation between the blade root and the leading edge.

Due to this guard, the shortest path so that an arc is formed between the metallised face 6 and the leading edge 3 that is shown in dashed lines on FIG. 3, being identified by Ch, necessarily bypasses the wall 14. This path Ch is thus significantly longer than the distance separating the metallised wall 6 from the metallic end 13 of the leading edge.

As can be seen on FIG. 3, the top face of the bottom wall 14 of the guard 12 supports two concentric circumferential walls identified by marks 16 and 17 each of which surrounds the blade root 4. Similarly, the bottom face of the guard 12 supports two other walls of the same type identified by marks 18 and 19, that are also concentric and surround the metallised face 6 and the electrode 7, projecting from this metallised face 6.

The wall 16 is shaped like a closed ribbon surrounding the root 4 and extending perpendicular to the top face of the bottom wall 14 that supports it. The wall 17 has the same shape as the wall 16 that it surrounds. The walls 18 and 19 are symmetric with walls 18 and 19 respectively about the plane of the bottom wall 14 that is generally plane, they can even further lengthen the path separating the blade root and the leading edge.

This guard 12 can be formed from two complementary parts nesting into each other so as to squeeze it and form an electrically insulating screen around this root.

When the blade 1 to be treated has been prepared, in other words when the bottom face 6 of its root has been metallised and an electrode 7 has been fixed to it, and an electrode 8 has also been fixed to the leading edge 3 to be electrically connected to it, the guard 12 is mounted around the root 4 before applying the treatment itself.

The electrode 8 of the leading edge 3 is then connected to a positive terminal of the voltage generator, and the electrode 7 of the blade body is connected to the negative terminal of the voltage generator, for example using crocodile type clips.

The generator is then manipulated to increase the applied voltage up to a voltage value that causes partial discharges at the interface between the leading edge and the blade body, in other words in the glue layer fixing these two elements to each other, which is typically a structural epoxy glue.

Specifically, the partial discharges are micro-electric discharges initiating in structural irregularities of an element placed in an electric field with an appropriate intensity. In the framework of the invention, these micro-discharges are provoked in the glue layer bonding the leading edge to the blade body made of a composite material.

In practice, by deteriorating the glue layer, the micro-discharges facilitate separation of the leading edge, this separation possibly being achieved by mechanical tension after application of the treatment, and possibly after also applying another treatment to degrade this glue layer.

In general, the voltage to be applied is between a minimum value of 300 volts and a maximum value corresponding to the maximum value allowable by the composite material of the blade body. This maximum voltage allowable by the blade body can be determined by tests to evaluate the threshold voltage causing damage to the material of the blade body.

These tests can consist of applying different voltages to different blade bodies, to identify the value starting at which micro-discharges appear within the composite material, and/or causing damage or degradation to the composite material. Similarly, tests can be performed to determine the minimum voltage necessary to obtain micro-discharges in the glue layer.

Identification of these threshold values then provides a means of determining the voltage to be applied between the leading edge and the blade body to cause separation.

In general, the invention can be used to modify defective gluing during fabrication of the blades, and to replace a damaged leading edge without needing to replace the entire blade that supports it, and possibly to recycle damaged leading edges made of titanium after they have been removed.

In the example described, the invention is applied to separation of a metallic leading edge glued to a blade body made of a composite material, but the invention is more generally applicable to separation of an electrically conducting material that is glued to an electrically insulating material.

In order to improve the method, the separation operation is used within an insulating material such as air, for example such as gaseous nitrogen under pressure equal for example to 30 bars or under a dielectric fluid such as a mineral or silicone oil. The choice of such a medium to implement the separation operation can limit or even extinguish any electric arcs in the process.

The invention claimed is:

1. A method of separating at least one portion of a metallic leading edge glued to a blade body made of a composite material of the carbon-epoxy type, comprising a step to degrade the glued interface between the metallic leading edge and the blade body, in which the metallic leading edge and the blade body are electrically connected to a dc electrical voltage generator so that an electrical potential difference can be applied to the metallic leading edge and the blade body to generate partial discharges in the glued interface to degrade the interface, wherein the blade body comprises a root through which the blade body is electrically connected to the electrical voltage generator and assembling a guard made of electrically insulating material surrounding a portion of the root of the blade body to form an electrically insulating screen extending between the metallic leading edge and the root to prevent an appearance of an electric arc between the root and the metallic leading edge.

2. The method according to claim 1, wherein the guard is an electrically insulating elastomer part comprising a central opening arranged to hold the root by squeezing the root.

3. The method according to claim 2, wherein the guard comprises two complementary parts joined together to surround the root.

4. The method according to claim 1, comprising a prior metallisation operation of a face of the root to apply voltage to most of the fibres of the composite material from which the blade body is made.

5. The method according to claim 4, wherein metallisation is done by depositing a metallic layer of copper, aluminium, silver or gold by cold plasma.

6. The method according to claim 4, wherein metallisation is achieved by application of a copper or aluminium adhesive tape on the root to connect the root to the voltage generator.

7. The method according to claim 1, wherein the glued interface degradation step is implemented within an electrically insulating fluid.

8. The method according to claim 7, wherein the electrically insulating fluid is pressurized nitrogen.

* * * * *